(12) United States Patent
Morrow et al.

(10) Patent No.: US 9,970,515 B2
(45) Date of Patent: *May 15, 2018

(54) MULTI-MODE ELECTROMECHANICAL VARIABLE TRANSMISSION

(71) Applicant: Oshkosh Corporation, Oshkosh, WI (US)

(72) Inventors: Jon J. Morrow, Oshkosh, WI (US); Andrew J. Kotloski, Oshkosh, WI (US); David J. Steinberger, Oshkosh, WI (US); Eric E. Braun, Neenah, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/595,443

(22) Filed: May 15, 2017

(65) Prior Publication Data

US 2017/0246946 A1   Aug. 31, 2017

Related U.S. Application Data

(63) Continuation of application No. 14/624,285, filed on Feb. 17, 2015, now Pat. No. 9,651,120.

(51) Int. Cl.
*F16H 3/72* (2006.01)
*B60K 6/365* (2007.10)
(Continued)

(52) U.S. Cl.
CPC ............. *F16H 3/727* (2013.01); *B60K 6/365* (2013.01); *B60K 6/387* (2013.01); *B60K 6/442* (2013.01);
(Continued)

(58) Field of Classification Search
None
See application file for complete search history.

(56) References Cited

U.S. PATENT DOCUMENTS

| 4,411,171 | A | 10/1983 | Fiala |
| 4,719,361 | A | 1/1988 | Brubaker |

(Continued)

FOREIGN PATENT DOCUMENTS

| CN | 101323243 A | 12/2008 |
| CN | 107405990 | 11/2017 |

(Continued)

OTHER PUBLICATIONS

U.S. Appl. No. 15/698,415, filed Sep. 7, 2017, Oshkosh Corporation.

(Continued)

*Primary Examiner* — Jacob S. Scott
(74) *Attorney, Agent, or Firm* — Foley & Lardner LLP

(57) ABSTRACT

A drive system includes a first gear set and a second gear set, each including a sun gear, a ring gear, a plurality of planetary gears coupling the sun gear to the ring gear, and a carrier rotationally supporting the plurality of planetary gears, a first electrical machine directly coupled to the sun gear of the first gear set, a second electrical machine directly coupled to the sun gear of the second gear set, a connecting shaft directly coupling an engine to the ring gear of the first gear set, a driveshaft configured to transport power from the first electrical machine, the second electrical machine, and the engine to a tractive element of the vehicle, and a clutch selectively rotationally coupling the first carrier and the second carrier to the driveshaft when engaged.

19 Claims, 10 Drawing Sheets

(51) Int. Cl.
*B60K 6/38* (2007.10)
*B60K 6/387* (2007.10)
*B60K 6/442* (2007.10)
*B60K 6/445* (2007.10)
*F16H 37/08* (2006.01)
*F16H 37/02* (2006.01)

(52) U.S. Cl.
CPC ............ *B60K 6/445* (2013.01); *F16H 3/728* (2013.01); *B60K 2006/381* (2013.01); *F16H 37/02* (2013.01); *F16H 37/084* (2013.01); *F16H 2037/0866* (2013.01); *F16H 2037/0873* (2013.01); *F16H 2200/20* (2013.01); *F16H 2200/2002* (2013.01); *F16H 2200/203* (2013.01); *F16H 2200/2007* (2013.01); *F16H 2200/2043* (2013.01); *Y02T 10/6239* (2013.01); *Y10S 903/917* (2013.01)

(56) References Cited

U.S. PATENT DOCUMENTS

| | | |
|---|---|---|
| 5,120,282 A | 6/1992 | Fjaellstroem |
| 5,498,208 A | 3/1996 | Braun |
| 5,501,567 A | 3/1996 | Lanzdorf et al. |
| 5,607,028 A | 3/1997 | Braun et al. |
| 5,669,842 A | 9/1997 | Schmidt |
| 5,722,502 A | 3/1998 | Kubo |
| 5,786,640 A | 7/1998 | Sakai et al. |
| 5,789,882 A | 8/1998 | Ibaraki et al. |
| 5,820,150 A | 10/1998 | Archer et al. |
| 5,820,258 A | 10/1998 | Braun |
| 5,895,333 A | 4/1999 | Morisawa et al. |
| 5,927,417 A | 7/1999 | Brunner et al. |
| 5,934,395 A | 8/1999 | Koide et al. |
| 6,086,074 A | 7/2000 | Braun |
| 6,105,984 A | 8/2000 | Schmitz et al. |
| 6,356,817 B1 | 3/2002 | Abe |
| 6,371,878 B1 | 4/2002 | Bowen |
| 6,478,705 B1 | 11/2002 | Holmes et al. |
| 6,516,914 B1 | 2/2003 | Andersen et al. |
| 6,553,287 B1 | 4/2003 | Supina et al. |
| 6,561,718 B1 | 5/2003 | Archer et al. |
| 6,575,866 B2 | 6/2003 | Bowen |
| 6,607,466 B2 | 8/2003 | Bordini |
| 6,702,709 B2 | 3/2004 | Bowen |
| 6,726,592 B2 | 4/2004 | Kotani |
| 6,757,597 B2 | 6/2004 | Yakes et al. |
| 6,764,085 B1 | 7/2004 | Anderson |
| 6,793,600 B2 | 9/2004 | Hiraiwa |
| 6,819,985 B2 | 11/2004 | Minagawa et al. |
| 6,846,257 B2 | 1/2005 | Baker et al. |
| 6,852,053 B2 | 2/2005 | Nakano et al. |
| 6,852,054 B2 | 2/2005 | Tumback et al. |
| 6,885,920 B2 | 4/2005 | Yakes et al. |
| 6,886,647 B1 | 5/2005 | Gotta |
| 6,991,054 B2 | 1/2006 | Takaoka et al. |
| 6,994,646 B2 | 2/2006 | Ai |
| 7,000,717 B2 | 2/2006 | Ai et al. |
| 7,004,868 B2 | 2/2006 | Oshidari et al. |
| 7,053,566 B2 | 5/2006 | Aizawa et al. |
| 7,073,620 B2 | 7/2006 | Braun et al. |
| 7,073,847 B2 | 7/2006 | Morrow et al. |
| 7,076,356 B2 * | 7/2006 | Hubbard ................ B60K 6/445 180/65.235 |
| 7,140,461 B2 | 11/2006 | Morrow |
| 7,154,236 B1 | 12/2006 | Heap |
| 7,164,977 B2 | 1/2007 | Yakes et al. |
| 7,179,187 B2 | 2/2007 | Raghavan et al. |
| 7,196,430 B2 | 3/2007 | Yang |
| 7,204,776 B2 | 4/2007 | Minagawa et al. |
| 7,217,211 B2 | 5/2007 | Klemen et al. |
| 7,219,756 B2 | 5/2007 | Bischoff |
| 7,223,200 B2 | 5/2007 | Kojima et al. |
| 7,246,672 B2 | 7/2007 | Shirai et al. |
| 7,258,194 B2 | 8/2007 | Braun et al. |
| 7,276,007 B2 | 10/2007 | Takami et al. |
| 7,277,782 B2 | 10/2007 | Yakes et al. |
| 7,322,896 B2 | 1/2008 | Minagawa |
| 7,338,401 B2 | 3/2008 | Klemen et al. |
| 7,357,203 B2 | 4/2008 | Morrow et al. |
| 7,367,415 B2 | 5/2008 | Oliver et al. |
| 7,419,021 B2 | 9/2008 | Morrow et al. |
| 7,448,460 B2 | 11/2008 | Morrow et al. |
| 7,467,678 B2 | 12/2008 | Tanaka et al. |
| 7,479,080 B2 | 1/2009 | Usoro |
| 7,520,354 B2 | 4/2009 | Morrow et al. |
| 7,527,573 B2 | 5/2009 | Lang et al. |
| 7,572,201 B2 | 8/2009 | Supina et al. |
| 7,597,164 B2 | 10/2009 | Severinsky et al. |
| 7,601,093 B2 | 10/2009 | Tabata et al. |
| 7,635,039 B2 | 12/2009 | Fujiwara et al. |
| 7,678,014 B2 | 3/2010 | Nohara et al. |
| 7,689,332 B2 | 3/2010 | Yakes et al. |
| 7,711,460 B2 | 5/2010 | Yakes et al. |
| 7,749,131 B2 | 7/2010 | Imamura et al. |
| 7,811,191 B2 | 10/2010 | Iwase et al. |
| 7,824,293 B2 | 11/2010 | Schimke |
| 7,874,373 B2 | 1/2011 | Morrow et al. |
| 7,878,750 B2 | 2/2011 | Zhou et al. |
| 7,888,894 B2 | 2/2011 | Sugawara et al. |
| 7,908,063 B2 | 3/2011 | Sah |
| 7,927,250 B2 | 4/2011 | Imamura et al. |
| 7,931,103 B2 | 4/2011 | Morrow et al. |
| 7,935,021 B2 | 5/2011 | Tabata et al. |
| 7,935,022 B2 | 5/2011 | Iwase et al. |
| 7,941,259 B2 | 5/2011 | Tabata et al. |
| 7,972,237 B2 | 7/2011 | Ota |
| 8,007,402 B2 | 8/2011 | Tabata et al. |
| 8,038,572 B2 | 10/2011 | Matsubara et al. |
| 8,062,172 B2 | 11/2011 | Supina et al. |
| 8,091,662 B2 | 1/2012 | Tolksdorf |
| 8,123,645 B2 | 2/2012 | Schimke |
| 8,337,352 B2 | 12/2012 | Morrow et al. |
| 8,561,735 B2 | 10/2013 | Morrow et al. |
| 8,801,318 B2 | 8/2014 | Knoble et al. |
| 8,864,613 B2 | 10/2014 | Morrow et al. |
| 9,114,699 B2 * | 8/2015 | Takei ................... B60K 6/365 |
| 9,114,804 B1 | 8/2015 | Shukla et al. |
| 9,132,736 B1 | 9/2015 | Shukla et al. |
| 9,428,042 B2 | 8/2016 | Morrow et al. |
| 9,452,750 B2 | 9/2016 | Shukla et al. |
| 9,492,695 B2 | 11/2016 | Betz et al. |
| 9,504,863 B2 | 11/2016 | Moore |
| 9,579,530 B2 | 2/2017 | Betz et al. |
| 9,580,962 B2 | 2/2017 | Betz et al. |
| 9,650,032 B2 | 5/2017 | Kotloski et al. |
| 9,651,120 B2 | 5/2017 | Morrow et al. |
| 9,656,659 B2 | 5/2017 | Shukla et al. |
| 9,677,334 B2 | 6/2017 | Aiken et al. |
| 2005/0234622 A1 | 10/2005 | Pillar et al. |
| 2008/0150350 A1 | 6/2008 | Morrow et al. |
| 2009/0194347 A1 | 8/2009 | Morrow et al. |
| 2009/0209381 A1 | 8/2009 | Ai et al. |
| 2009/0221390 A1 | 9/2009 | Houle |
| 2009/0227409 A1 | 9/2009 | Ito et al. |
| 2009/0227417 A1 | 9/2009 | Imamura et al. |
| 2009/0275437 A1 | 11/2009 | Kersting |
| 2010/0051361 A1 | 3/2010 | Katsuta et al. |
| 2010/0051367 A1 | 3/2010 | Yamada et al. |
| 2010/0120579 A1 | 5/2010 | Kawasaki |
| 2010/0138086 A1 | 6/2010 | Imamura et al. |
| 2010/0145589 A1 | 6/2010 | Kobayashi |
| 2010/0227722 A1 | 9/2010 | Conlon |
| 2010/0261565 A1 | 10/2010 | Ai et al. |
| 2010/0301668 A1 | 12/2010 | Yakes et al. |
| 2010/0326752 A1 | 12/2010 | Lamperth |
| 2011/0319211 A1 | 12/2011 | Si |
| 2012/0022737 A1 | 1/2012 | Kumazaki et al. |
| 2013/0196806 A1 | 8/2013 | Morrow et al. |
| 2013/0260936 A1 | 10/2013 | Takei et al. |
| 2014/0269145 A1 | 9/2014 | Fasana et al. |
| 2014/0350803 A1 | 11/2014 | Ye et al. |
| 2015/0246331 A1 | 9/2015 | Broker et al. |

(56) References Cited

U.S. PATENT DOCUMENTS

| | | |
|---|---|---|
| 2015/0283894 A1 | 10/2015 | Morrow et al. |
| 2016/0311253 A1 | 10/2016 | Palmer et al. |
| 2016/0361987 A1 | 12/2016 | Morrow et al. |
| 2017/0008507 A1 | 1/2017 | Shukla et al. |
| 2017/0108085 A1 | 4/2017 | Morrow et al. |
| 2017/0246946 A1 | 8/2017 | Morrow et al. |
| 2017/0246947 A1 | 8/2017 | Kotloski et al. |
| 2017/0253229 A1 | 9/2017 | Shukla et al. |

FOREIGN PATENT DOCUMENTS

| | | |
|---|---|---|
| EP | 1 229 636 A2 | 8/2002 |
| GB | 2 400 588 | 1/2005 |
| GB | 2 400 589 | 2/2005 |
| GB | 2 400 590 | 3/2005 |
| JP | 2010-070008 A | 4/2010 |
| WO | WO-03/055714 A1 | 7/2003 |
| WO | WO-03/093046 A2 | 11/2003 |
| WO | WO-2004/083081 | 9/2004 |
| WO | WO-2004/110849 | 12/2004 |
| WO | WO-2006/028452 | 3/2006 |
| WO | WO-2006/037041 | 4/2006 |
| WO | WO-2006/037098 | 4/2006 |
| WO | WO-2006/037099 | 4/2006 |
| WO | WO-2007/108805 | 9/2007 |
| WO | WO-2011/041549 | 4/2011 |
| WO | WO-2011/163135 | 12/2011 |
| WO | WO-2016/133557 | 8/2016 |
| WO | WO-2016/172250 | 10/2016 |
| WO | WO-2017/007599 | 1/2017 |
| WO | WO-2017/007600 | 1/2017 |
| WO | WO-2017/070388 | 4/2017 |

OTHER PUBLICATIONS

U.S. Appl. No. 15/725,154, filed Oct. 4, 2017, Oshkosh Corporation.
Diesel Locomotive Technology, http://www.railway-technical.com/diesel.shtml, available by Jan. 24, 2012, 15 pages.
Miller, Hybrid Electric Vehicle Propulsion System Architectures of the e-CVT Type, IEEE Transactions on Power Electronics, vol. 21, No. 3, May 2006, 12 pages.

* cited by examiner

MULTI-MODE ELECTROMECHANICAL VARIABLE TRANSMISSION

CROSS-REFERENCE TO RELATED PATENT APPLICATIONS

This application is a continuation of U.S. application Ser. No. 14/624,285, filed Feb. 17, 2015, which is incorporated herein by reference in its entirety.

BACKGROUND

Internal combustion engine vehicles, hybrid vehicles, and electric vehicles, among other types of vehicles, include transmissions. Traditional vehicle transmissions use gears and gear trains to provide speed and torque conversions from a rotating power source (e.g., an engine, a motor, etc.) to another device (e.g., a drive shaft, wheels of a vehicle, etc.). Transmissions include multiple gear ratios selectively coupled to the rotating power source with a mechanism that may also selectively couple an output to the various gear ratios.

SUMMARY

One exemplary embodiment relates to a drive system for a vehicle. The drive system includes a first gear set having a first sun gear, a first ring gear, a first plurality of planetary gears coupling the first sun gear to the first ring gear, and a first carrier rotationally supporting the first plurality of planetary gears, and a second gear set having a second sun gear, a second ring gear, a second plurality of planetary gears coupling the second sun gear to the second ring gear, and a second carrier rotationally supporting the second plurality of planetary gears. The first carrier is directly coupled to the second carrier. The drive system also includes a first electrical machine directly coupled to the first sun gear of the first gear set, a second electrical machine directly coupled to the second sun gear of the second gear set, a connecting shaft directly coupling an engine to the first ring gear of the first gear set, a driveshaft configured to transport power from the first electrical machine, the second electrical machine, and the engine to a tractive element of the vehicle, and a clutch selectively rotationally coupling the first carrier and the second carrier to the driveshaft when engaged.

Another exemplary embodiment relates to a drive system for a vehicle. The drive system includes a first planetary gear set, a second planetary gear set coupled to the first planetary gear set, an engine coupled to the first planetary gear set with a connecting shaft, a first electromagnetic device including a first shaft and coupled to the first planetary gear set, a second electromagnetic device including a second shaft, coupled to the second planetary gear set, and selectively rotationally engaged with the engine, and an output selectively coupled to the first planetary gear set and the second planetary gear set. The first planetary gear set, the second planetary gear set, the connecting shaft, the first shaft, and the second shaft are radially aligned, while the output is radially offset from the first planetary gear set, the second planetary gear set, the connecting shaft, the first shaft, and the second shaft. The connecting shaft extends through the second electromagnetic device and through the second planetary gear set to the first planetary gear set.

Another exemplary embodiment relates to a vehicle including a multi-mode transmission. The multi-mode transmission includes a first gear set having a first planetary gear carrier and a second gear set having a second planetary gear carrier. The first planetary gear carrier and the second planetary gear carrier are rotatably coupled. The multi-mode transmission further includes a first motor/generator coupled to the first gear set and a second motor/generator coupled to the second gear set. The vehicle further includes an engine selectively coupled to the second gear set and a drive axle selectively coupled to the multi-mode transmission. During a power generation mode of the multi-mode transmission, the engine is coupled to the second motor/generator and decoupled from the drive axle. During a series electric mode of the multi-mode transmission, the engine is decoupled from the second motor/generator, the second motor/generator is selectively coupled to the drive axle, and the engine is coupled to the first motor/generator.

The invention is capable of other embodiments and of being carried out in various ways. Alternative exemplary embodiments relate to other features and combinations of features as may be recited herein.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

According to an exemplary embodiment, a multi-mode electromechanical variable transmission is provided as part of a vehicle and is selectively reconfigurable into one of a plurality of operating modes. The vehicle may also include an engine, a first electromagnetic device, and second electromagnetic device. In one embodiment, at least one of the first electromagnetic device and the second electromagnetic device provides rotational mechanical energy to start the engine. In another embodiment, the engine provides a rotational mechanical energy input to both the first and second electromagnetic devices such that each operates as a generator to generate electrical energy. In still other embodiments, one of the first electromagnetic device and the second electromagnetic device are configured to receive a rotational mechanical energy output from at least one of the engine and the multi-mode electromechanical variable transmission and provide an electrical energy output to power a control system and/or the other electromagnetic device.

Figure 1:
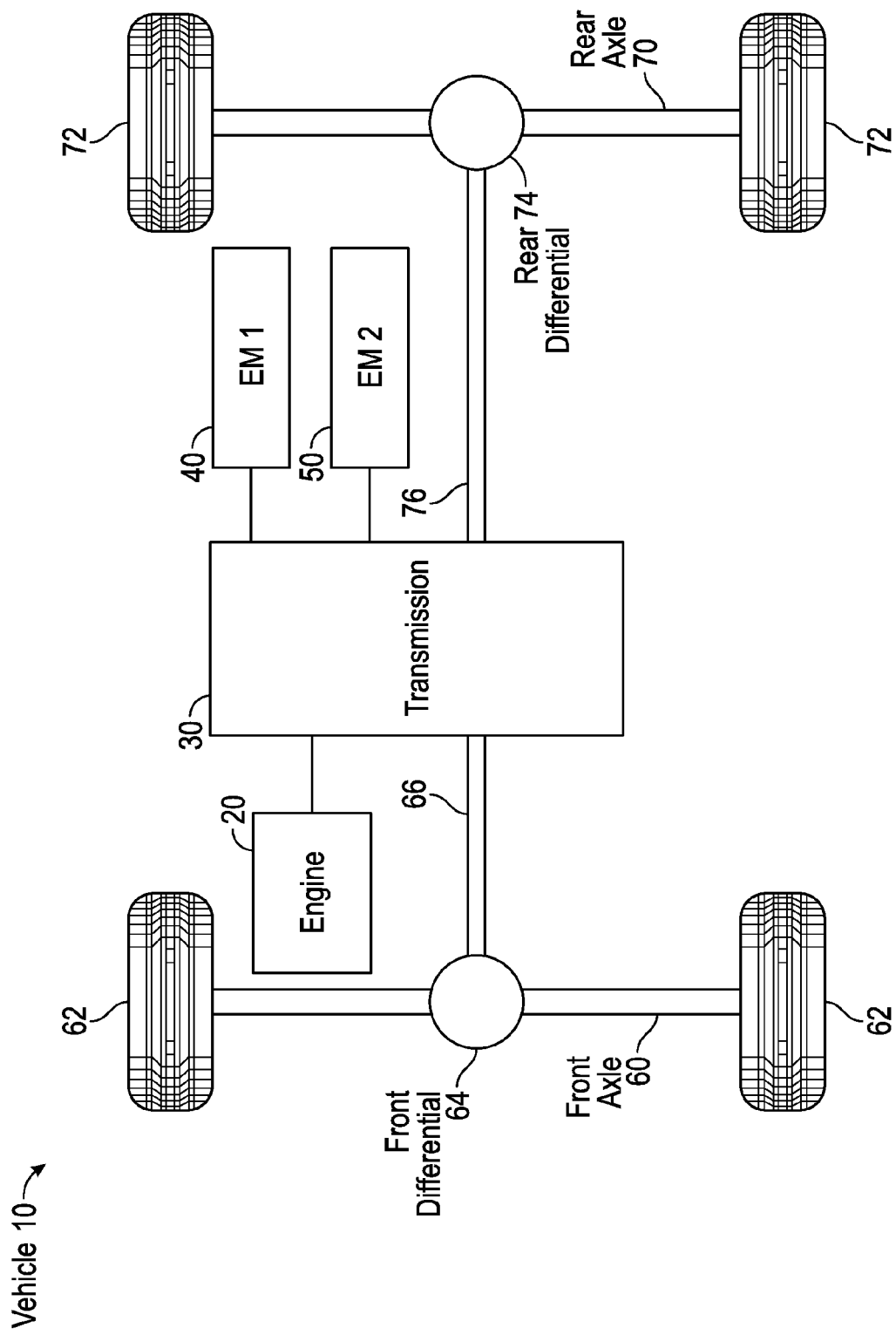
FIG. 1 is a schematic view of a drive train for a vehicle, according to an exemplary embodiment.
Figure 2:
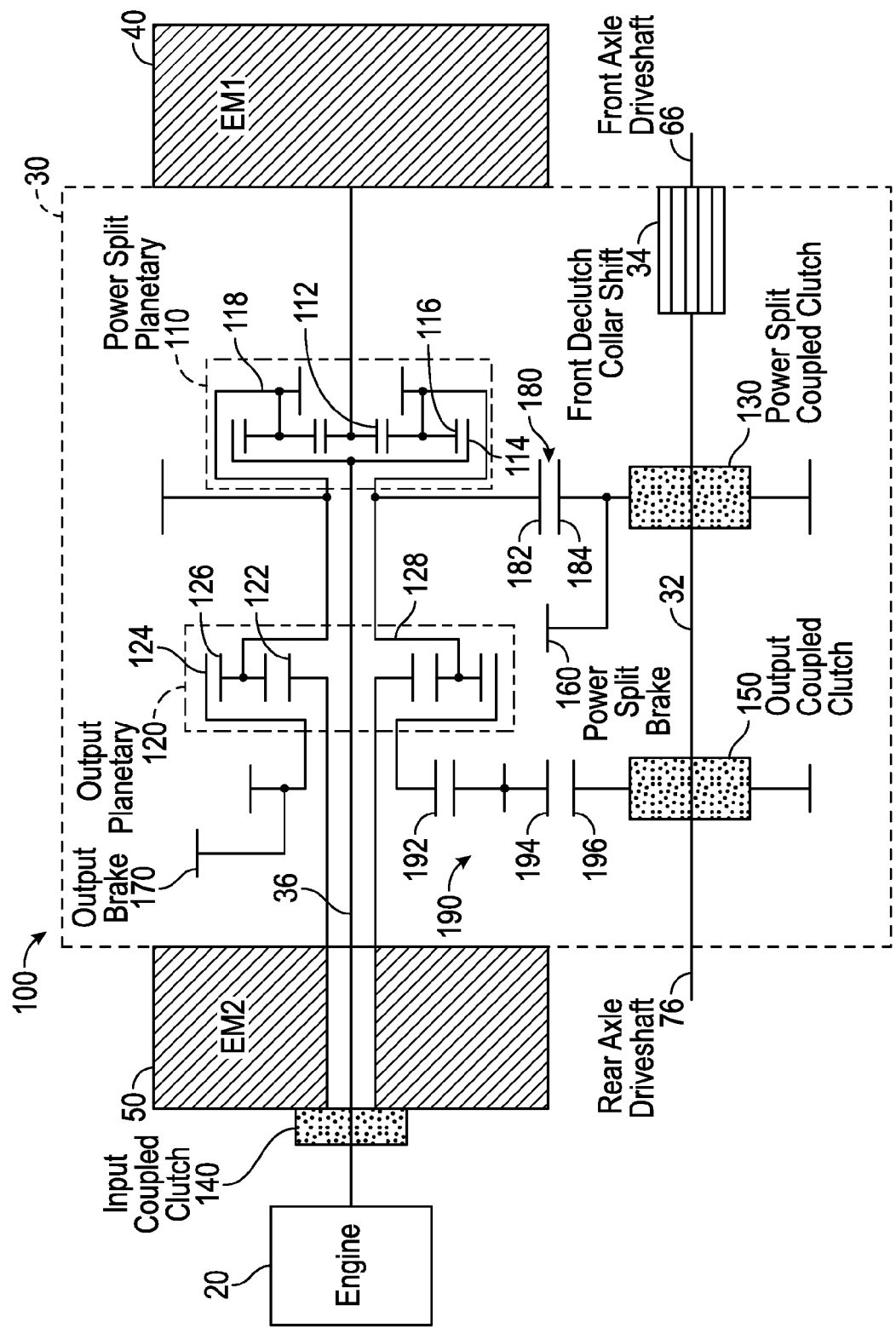
FIG. 2 is a detailed schematic view of the drive train of FIG. 1, according to an exemplary embodiment.

According to the exemplary embodiment shown in FIGS. 1-2, a vehicle 10 includes an engine 20 coupled to a transmission, shown as transmission 30. In one embodiment, engine 20 is configured to combust fuel and provide a mechanical energy input to transmission 30. By way of example, engine 20 may be configured to provide a rotational mechanical energy input to transmission 30. As shown in FIGS. 1-2, a first electrical machine, electromagnetic device and/or motor/generator, shown as first electromagnetic device 40, and a second electrical machine, electromagnetic device and/or motor/generator, shown as second electromagnetic device 50, are coupled to transmission 30.

Referring again to the exemplary embodiment shown in FIG. 1, vehicle 10 includes a front axle, shown as front axle 60, and a rear axle, shown as rear axle 70. As shown in FIG. 1, front axle 60 includes a pair of tractive elements, shown as tires 62, coupled to a front differential, shown as front differential 64. Rear axle 70 includes a pair of tractive elements, shown as tires 72, coupled to a rear differential, shown as rear differential 74, according to an exemplary embodiment. According to the exemplary embodiment shown in FIG. 1, front differential 64 is coupled to transmission 30 with a front axle driveshaft 66 and rear differential 74 is coupled to transmission 30 with a rear axle driveshaft 76. While shown as coupled to tires 62 and tires 72, front differential 64 and rear differential 74 may be coupled to various other types of tractive elements (e.g., tracks, etc.), according to alternative embodiments. As shown in FIG. 1, front axle driveshaft 66 and rear axle driveshaft 76 are configured to transport power from first electromagnetic device 40, second electromagnetic device 50, and engine 20 to tires 62 and tires 72, respectively. Vehicle 10 may include a plurality of front differentials 64 that may be coupled or a plurality of rear differentials 74 that may be coupled, according to various alternative embodiments.

Engine 20 may be any source of rotational mechanical energy that is derived from a stored energy source. The stored energy source is disposed onboard vehicle 10, according to an exemplary embodiment. The stored energy source may include a liquid fuel or a gaseous fuel, among other alternatives. In one embodiment, engine 20 includes an internal combustion engine configured to be powered by at least one of gasoline, natural gas, and diesel fuel. According to various alternative embodiments, engine 20 includes at least one of a turbine, a fuel cell, an electric motor or still another device. According to one exemplary embodiment, engine 20 includes a twelve liter diesel engine capable of providing between approximately 400 horsepower and approximately 600 horsepower and between approximately 400 foot pounds of torque and approximately 2000 foot pounds of torque. In one embodiment, engine 20 has a rotational speed (e.g., a rotational operational range, etc.) of between 0 and 2,100 revolutions per minute. Engine 20 may be operated at a relatively constant speed (e.g., 1,600 revolutions per minute, etc.). In one embodiment, the relatively constant speed is selected based on an operating condition of engine 20 (e.g., an operating speed relating to a point of increased fuel efficiency, etc.).

In one embodiment, at least one of first electromagnetic device 40 and second electromagnetic device 50 provide a mechanical energy input to transmission 30. By way of example, at least one of first electromagnetic device 40 and second electromagnetic device 50 may be configured to provide a rotational mechanical energy input to transmission 30 (i.e., at least one of first electromagnetic device 40 and second electromagnetic device 50 may operate as a motor, etc.). At least one of first electromagnetic device 40 and second electromagnetic device 50 may receive a mechanical energy output from at least one of engine 20 and transmission 30. By way of example, at least one of first electromagnetic device 40 and second electromagnetic device 50 may be configured to receive a rotational mechanical energy output from at least one of engine 20 and transmission 30 and provide an electrical energy output (i.e., at least one of first electromagnetic device 40 and second electromagnetic device 50 may operate as a generator, etc.). According to an exemplary embodiment, first electromagnetic device 40 and second electromagnetic device 50 are capable of both providing mechanical energy and converting a mechanical energy input into an electrical energy output (i.e., operate as a motor and a generator, etc.). The operational condition of first electromagnetic device 40 and second electromagnetic device 50 (e.g., as a motor, as a generator, etc.) may vary based on a mode of operation associated with transmission 30.

According to the exemplary embodiment shown in FIG. 2, a drive system for a vehicle, shown as drive system 100, includes engine 20, transmission 30, first electromagnetic device 40, second electromagnetic device 50, front axle driveshaft 66, and rear axle driveshaft 76. As shown in FIG. 2, transmission 30 includes a first gear set, shown as power split planetary 110, and a second gear set, shown as output planetary 120. In one embodiment, power split planetary 110 and output planetary 120 are disposed between first electromagnetic device 40 and second electromagnetic device 50. In an alternative embodiment, one or both of power split planetary 110 and output planetary 120 are positioned outside of (i.e., not between, etc.) first electromagnetic device 40 and second electromagnetic device 50. As shown in FIG. 2, power split planetary 110 is directly coupled to engine 20.

Referring to the exemplary embodiment shown in FIG. 2, power split planetary 110 is a planetary gear set that includes a sun gear 112, a ring gear 114, and a plurality of planetary gears 116. The plurality of planetary gears 116 couple sun gear 112 to ring gear 114, according to an exemplary embodiment. As shown in FIG. 2, a carrier 118 rotationally supports the plurality of planetary gears 116. In one embodiment, first electromagnetic device 40 is directly coupled to sun gear 112 such that power split planetary 110 is coupled to first electromagnetic device 40. By way of example, first electromagnetic device 40 may include a shaft (e.g., a first shaft, an input shaft, an output shaft, etc.) directly coupled to sun gear 112.

Referring still to the exemplary embodiment shown in FIG. 2, output planetary 120 is a planetary gear set that includes a sun gear 122, a ring gear 124, and a plurality of planetary gears 126. The plurality of planetary gears 126 couple sun gear 122 to ring gear 124, according to an exemplary embodiment. As shown in FIG. 2, a carrier 128 rotationally supports the plurality of planetary gears 126. In one embodiment, second electromagnetic device 50 is directly coupled to sun gear 122 such that output planetary 120 is coupled to second electromagnetic device 50. By way of example, second electromagnetic device 50 may include a shaft (e.g., a second shaft, an input shaft, an output shaft, etc.) directly coupled to sun gear 122. Carrier 118 is directly coupled to carrier 128, thereby coupling power split planetary 110 to output planetary 120, according to the exemplary embodiment shown in FIG. 2. In one embodiment, directly coupling carrier 118 to carrier 128 synchronizes rotational speeds of carrier 118 and carrier 128.

According to an exemplary embodiment, transmission 30 includes a first clutch, shown as power split coupled clutch 130. In one embodiment, power split coupled clutch 130 is positioned downstream of power split planetary 110 (e.g., between power split planetary 110 and front axle driveshaft 66 or rear axle driveshaft 76, etc.). In an alternative embodiment, power split coupled clutch 130 is directly coupled to engine 20. As shown in FIG. 2, power split coupled clutch 130 is positioned to selectively couple power split planetary 110 and output planetary 120 with a shaft, shown as output shaft 32. In one embodiment, power split coupled clutch 130 allows a vehicle to be towed without spinning the gears within transmission 30 (e.g., power split planetary 110, output planetary 120, etc.). Output shaft 32 may be coupled to rear axle driveshaft 76 and selectively coupled to front axle driveshaft with a declutch assembly, shown as front declutch collar shift 34. Front declutch collar shift 34 may be engaged and disengaged to selectively couple front axle driveshaft 66 to output shaft 32 of transmission 30 (e.g., to facilitate operation of a vehicle in a rear-wheel-drive-only mode, an all-wheel-drive mode, a four-wheel-drive mode, etc.).

As shown in FIG. 2, transmission 30 includes a second clutch, shown as input coupled clutch 140. Input coupled clutch 140 is positioned to selectively couple second electromagnetic device 50 with engine 20, according to an exemplary embodiment. Input coupled clutch 140 may thereby selectively couple engine 20 to output planetary 120. As shown in FIG. 2, transmission 30 includes a shaft, shown as connecting shaft 36. According to an exemplary embodiment, connecting shaft 36 extends from engine 20, through second electromagnetic device 50, and through output planetary 120 to power split planetary 110. Connecting shaft 36 couples engine 20 with power split planetary 110, according to the exemplary embodiment shown in FIG. 2. In one embodiment, connecting shaft 36 directly couples engine 20 with ring gear 114 of power split planetary 110. Input coupled clutch 140 may selectively couple second electromagnetic device 50 with connecting shaft 36. According to an exemplary embodiment, the shaft (e.g., input/output shaft, etc.) of first electromagnetic device 40 and the shaft (e.g., input/output shaft, etc.) of second electromagnetic device 50 are radially aligned with power split planetary 110, output planetary 120, and connecting shaft 36 (e.g., centerlines thereof are aligned, etc.). As shown in FIG. 2, transmission 30 includes a third clutch, shown as output coupled clutch 150. Output coupled clutch 150 is positioned to selectively couple output planetary 120 with output shaft 32, according to an exemplary embodiment. In one embodiment, output shaft 32 is radially offset from power split planetary 110, output planetary 120, and connecting shaft 36 (e.g., radially offset from centerlines thereof, etc.).

Referring again to the exemplary embodiment shown in FIG. 2, transmission 30 includes a first brake, shown as power split brake 160. As shown in FIG. 2, power split brake 160 is positioned to selectively inhibit the movement of at least a portion of power split planetary 110 (e.g., planetary gears 116, carrier 118, etc.) and output planetary 120 (e.g., planetary gears 126, carrier 128, etc.). In other embodiments, transmission 30 does not include power split brake 160. Power split brake 160 may thereby be an optional component of transmission 30. According to an exemplary embodiment, transmission 30 includes a second brake (or a first brake in embodiments where transmission 30 does not include power split brake 160), shown as output brake 170. Output brake 170 is positioned to selectively inhibit the movement of at least a portion of output planetary 120 (e.g., ring gear 124, etc.), according to an exemplary embodiment. In one embodiment, at least one of power split brake 160 and output brake 170 are biased into an engaged position (e.g., with a spring, etc.) and selectively disengaged (e.g., with application of pressurized hydraulic fluid, etc.). In other embodiments, power split brake 160 and output brake 170 are hydraulically-biased and spring released. In still other embodiments, the components of transmission 30 are still otherwise engaged and disengaged (e.g., pneumatically, etc.). By way of example, output brake 170 and output coupled clutch 150 may be engaged simultaneously to function as a driveline brake (e.g., a braking mechanism to slow down a vehicle, etc.). By way of another example, power split brake 160 and power split coupled clutch 130 may be engaged simultaneously to function as a driveline brake.

As shown in FIG. 2, transmission 30 includes a gear set 180 that couples carrier 118 and carrier 128 to output shaft 32. In one embodiment, gear set 180 includes a first gear, shown as gear 182, in meshing engagement with a second gear, shown as gear 184. As shown in FIG. 2, gear 182 is rotatably coupled to carrier 118 and carrier 128. By way of example, gear 182 may be fixed to a component (e.g., shaft, tube, etc.) that couples carrier 118 and carrier 128. As shown in FIG. 2, power split coupled clutch 130 is positioned to selectively couple gear 184 with output shaft 32 when engaged. With power split coupled clutch 130 disengaged, relative movement (e.g., rotation, etc.) may occur between gear 184 and output shaft 32. Power split brake 160 may be positioned to selectively limit the movement of gear 184 when engaged to thereby limit the movement of gear 182, carrier 118, and carrier 128.

According to an exemplary embodiment, transmission 30 includes a gear set, shown as gear set 190, that couples output planetary 120 to output shaft 32. As shown in FIG. 2, gear set 190 includes a first gear, shown as gear 192, coupled to ring gear 124 of output planetary 120. Gear 192 is in meshing engagement with a second gear, shown as gear 194, according to an exemplary embodiment. As shown in FIG. 2, gear 194 is coupled to a third gear, shown as gear 196. In other embodiments, gear 192 is directly coupled with gear 196. By way of example, gear set 190 may not include gear 194, and gear 192 may be directly coupled to (e.g., in meshing engagement with, etc.) gear 196. As shown in FIG. 2, output coupled clutch 150 is positioned to selectively couple gear 196 with output shaft 32 when engaged. With output coupled clutch 150 disengaged, relative movement (e.g., rotation, etc.) may occur between gear 196 and output shaft 32. By way of example, output coupled clutch 150 may be engaged to couple ring gear 124 to output shaft 32. Output brake 170 is positioned to selectively limit the movement of gear 192 when engaged to thereby also limit the movement of ring gear 124, gear 194, and gear 196.

Figure 3:
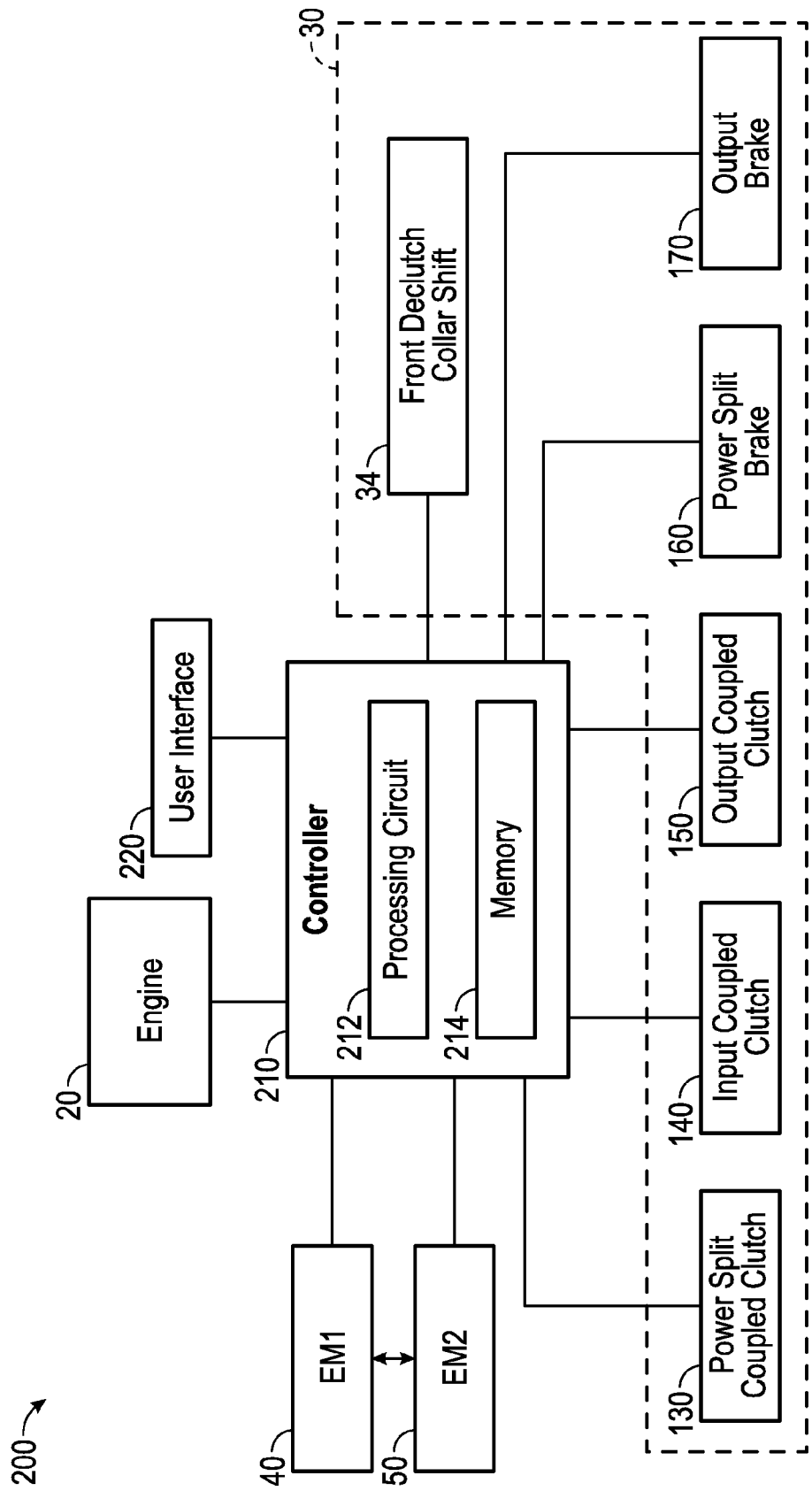
FIG. 3 is a schematic diagram of a control system for the drive train of FIG. 1, according to an exemplary embodiment.

According to the exemplary embodiment shown in FIG. 3, a control system 200 for a vehicle includes a controller 210. In one embodiment, controller 210 is configured to selectively engage, selectively disengage, or otherwise communicate with components of the vehicle according to various modes of operation. As shown in FIG. 3, controller 210 is coupled to engine 20. In one embodiment, controller 210 is configured to selectively engage engine 20 (e.g., interface with a throttle of, etc.) such that an output of engine 20 spins at a target rate. Controller 210 is coupled to first electromagnetic device 40 and second electromagnetic device 50, according to an exemplary embodiment, and may send and receive signals therewith. By way of example, controller 210 may send command signals relating to at least one of a target rotational speed and a target rotation direction for first electromagnetic device 40 and second electromagnetic device 50. As shown in FIG. 3, first electromagnetic device 40 and second electromagnetic device 50 are electrically coupled. By way of example, power generated by first electromagnetic device 40 may be utilized by second electromagnetic device 50 (e.g., to provide an output torque as a motor, etc.), or power generated by second electromagnetic device 50 may be utilized by first electromagnetic device 40 (e.g., to provide an output torque as a motor, etc.).

According to the exemplary embodiment shown in FIG. 3, control system 200 includes a user interface 220 that is coupled to controller 210. In one embodiment, user interface 220 includes a display and an operator input. The display may be configured to display a graphical user interface, an image, an icon, or still other information. In one embodiment, the display includes a graphical user interface configured to provide general information about the vehicle (e.g., vehicle speed, fuel level, warning lights, etc.). The graphical user interface may also be configured to display a current mode of operation, various potential modes of operation, or still other information relating to transmission 30 or drive system 100. By way of example, the graphical user interface may be configured to provide specific information regarding the operation of drive system 100 (e.g., whether power split coupled clutch 130, input coupled clutch 140, output coupled clutch 150, power split brake 160, and output brake 170 are engaged or disengaged, a fault condition where at least one of power split coupled clutch 130, input coupled clutch 140, output coupled clutch 150, power split brake 160, and output brake 170 fail to engage or disengage in response to a command signal, etc.).

The operator input may be used by an operator to provide commands to at least one of engine 20, transmission 30, first electromagnetic device 40, second electromagnetic device 50, and drive system 100 or still another component of the vehicle. The operator input may include one or more buttons, knobs, touchscreens, switches, levers, or handles. In one embodiment, an operator may press a button to change the mode of operation for at least one of transmission 30, and drive system 100, and the vehicle. The operator may be able to manually control some or all aspects of the operation of transmission 30 using the display and the operator input. In should be understood that any type of display or input controls may be implemented with the systems and methods described herein.

Controller 210 may be implemented as a general-purpose processor, an application specific integrated circuit (ASIC), one or more field programmable gate arrays (FPGAs), a digital-signal-processor (DSP), circuits containing one or more processing components, circuitry for supporting a microprocessor, a group of processing components, or other suitable electronic processing components. According to the exemplary embodiment shown in FIG. 3, controller 210 includes a processing circuit 212 and a memory 214. Processing circuit 212 may include an ASIC, one or more FPGAs, a DSP, circuits containing one or more processing components, circuitry for supporting a microprocessor, a group of processing components, or other suitable electronic processing components. In some embodiments, processing circuit 212 is configured to execute computer code stored in memory 214 to facilitate the activities described herein. Memory 214 may be any volatile or non-volatile computer-readable storage medium capable of storing data or computer code relating to the activities described herein. According to an exemplary embodiment, memory 214 includes computer code modules (e.g., executable code, object code, source code, script code, machine code, etc.) configured for execution by processing circuit 212. Memory 214 includes various actuation profiles corresponding to modes of operation (e.g., for transmission 30, for drive system 100, for a vehicle, etc.), according to an exemplary embodiment. In some embodiments, controller 210 may represent a collection of processing devices (e.g., servers, data centers, etc.). In such cases, processing circuit 212 represents the collective processors of the devices, and memory 214 represents the collective storage devices of the devices.

Referring next to the exemplary embodiments shown in FIGS. 4-10, transmission 30 is configured to operate according to a plurality of modes of operation. Various modes of operation for transmission 30 are identified below in Table 1. In other embodiments, a vehicle having transmission 30 is configured to operate according to the various modes of operation shown in FIGS. 4-10 and identified below in Table 1.

TABLE 1

| Mode of Operation | Power Split Brake 160 | Power Split Coupled Clutch 130 | Output Coupled Clutch 150 | Output Brake 170 | Input Coupled Clutch 140 |
|---|---|---|---|---|---|
| High Speed Reverse | | X | | X | |
| Low Speed Reverse | | X | X | | |
| Power Generation | X | | | | X |
| Neutral/ Vehicle Start | | | | | |
| Low Range | | X | X | | |
| Mid Range | | X | | X | |
| High Range | | X | | | X |

As shown in Table 1, an "X" represents a component of drive system 100 (e.g., power split brake 160, power split coupled clutch 130, etc.) that is engaged or closed during the respective modes of operation. In other embodiments, power split brake 160 may be engaged during a neutral startup mode.

Figure 4:
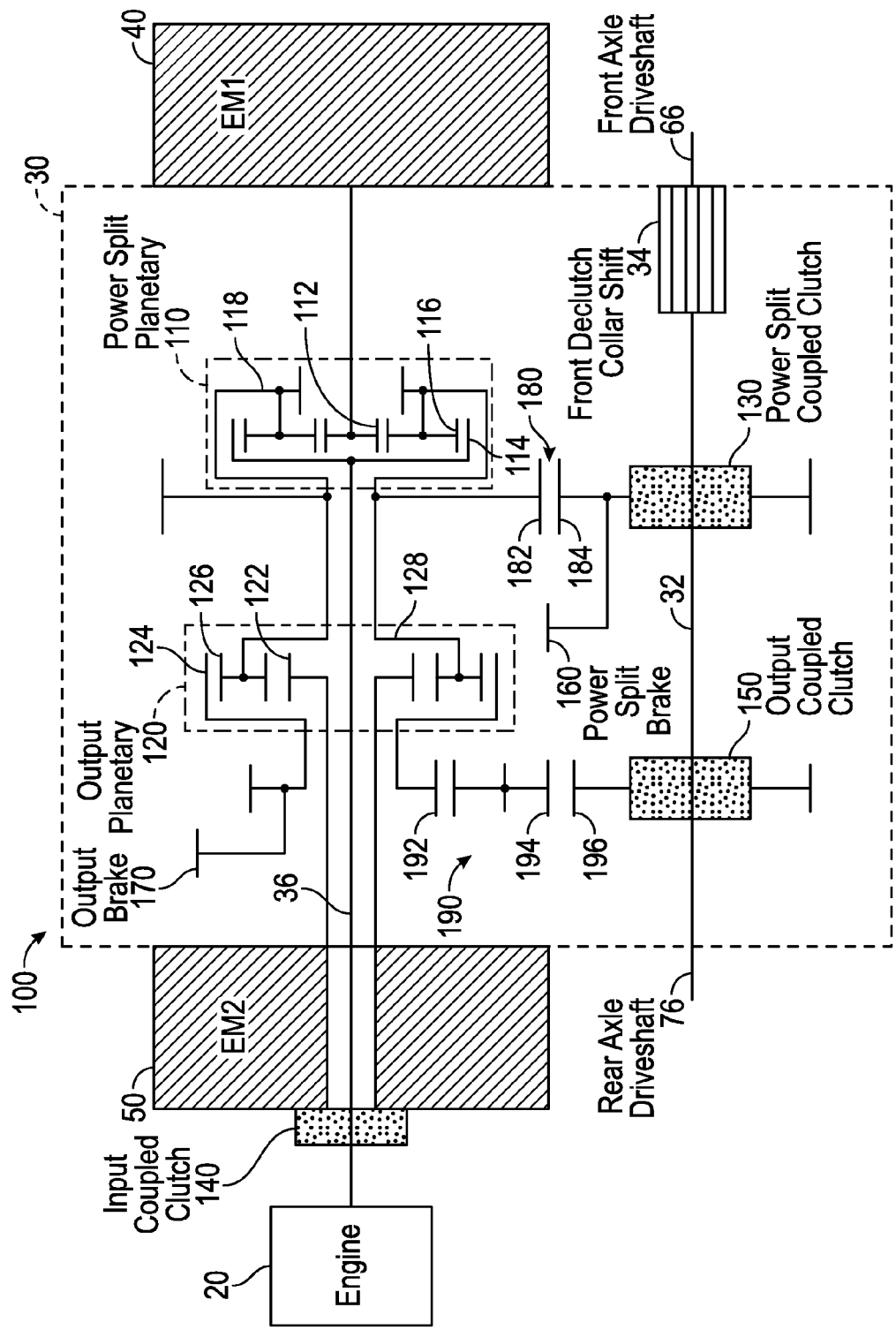
FIG. 4 is a detailed schematic view of a drive train configured in a neutral startup mode of operation, according to an exemplary embodiment.

As shown in FIG. 4, transmission 30 is selectively reconfigured into a neutral startup mode. In one embodiment, rotation of first electromagnetic device 40 rotates connecting shaft 36 to start engine 20. An energy storage device (e.g., a capacitor, a battery, etc.) configured to store energy (e.g., electrical energy, chemical energy, etc.) may be associated with drive system 100. By way of example, first electromagnetic device 40 may be configured to use the stored energy to start engine 20 by providing a rotational mechanical energy input (e.g., a torque, etc.) to engine 20 via connecting shaft 36. In an alternative embodiment, engine 20 includes a traditional starting mechanism (e.g., a starter motor, etc.) configured to start engine 20. Engine 20 may provide a rotational mechanical energy input to at least one of first electromagnetic device 40 and/or second electromagnetic device 50. The first electromagnetic device 40 and second electromagnetic device 50 may be brought up to a threshold (e.g., a threshold speed, a threshold speed for a target period of time, a threshold power generation, a threshold power generation for a target period of time, etc.) that establishes a requisite DC bus voltage. Both first electromagnetic device 40 and second electromagnetic device 50 may thereafter be activated and controlled within and/or to desired states. The power electronics of control system 200 that control the motor-to-motor functions may be brought online during the neutral startup mode.

In one embodiment, transmission 30 includes power split brake 160, and power split brake 160 is engaged when transmission 30 is configured in the neutral startup mode. According to an exemplary embodiment, engaging power split brake 160 selectively limits the rotational movement of portions of both power split planetary 110 and output planetary 120. By way of example, engaging power split brake 160 may inhibit the rotational movement of gear 182, gear 184, and carrier 118 such that each remains rotationally fixed. Accordingly, carrier 128 also remains rotationally fixed because carrier 118 and carrier 128 are directly coupled. According to an exemplary embodiment, an energy flow path in the neutral startup mode includes: first electromagnetic device 40 providing a rotational mechanical energy input to sun gear 112 that is received by the plurality of planetary gears 116; the plurality of planetary gears 116 rotating about central axes thereof (e.g., planetary gears 116 may or may not rotate about sun gear 112 because carrier 118 may or may not be rotationally fixed, etc.); the plurality of planetary gears 116 conveying the rotational mechanical energy to ring gear 114; ring gear 114 transferring the rotational mechanical energy to connecting shaft 36 such that the rotational mechanical energy provided by first electromagnetic device 40 starts engine 20. Another energy flow path in the neutral startup mode may include engine 20 providing a rotational mechanical energy input to ring gear 114 that is received by the plurality of planetary gears 116; the plurality of planetary gears 116 rotating about central axes thereof (e.g., planetary gears 116 may or may not rotate about sun gear 112 because carrier 118 may or may not be rotationally fixed, etc.); the plurality of planetary gears 116 conveying the rotational mechanical energy to sun gear 112; and sun gear 112 conveying the rotational mechanical energy to first electromagnetic device 40 to bring first electromagnetic device 40 up to the threshold for establishing a requisite DC bus voltage and controlling first electromagnetic device 40 and/or second electromagnetic device 50 in a desired state.

Power split brake 160 may be used to isolate engine 20, first electromagnetic device 40, and second electromagnetic device 50 from output shaft 32 in the neutral startup mode. Such isolation may substantially eliminate a forward lurch potential of the vehicle (e.g., transmission 30 does not provide an output torque to tires 62 and/or tires 72, etc.). By way of example, the neutral startup mode utilizing power split brake 160 may be used to start engine 20, establish a requisite DC bus voltage, or otherwise export power without relying on controller 210 to engage first electromagnetic device 40 and/or second electromagnetic device 50.

Figure 5:
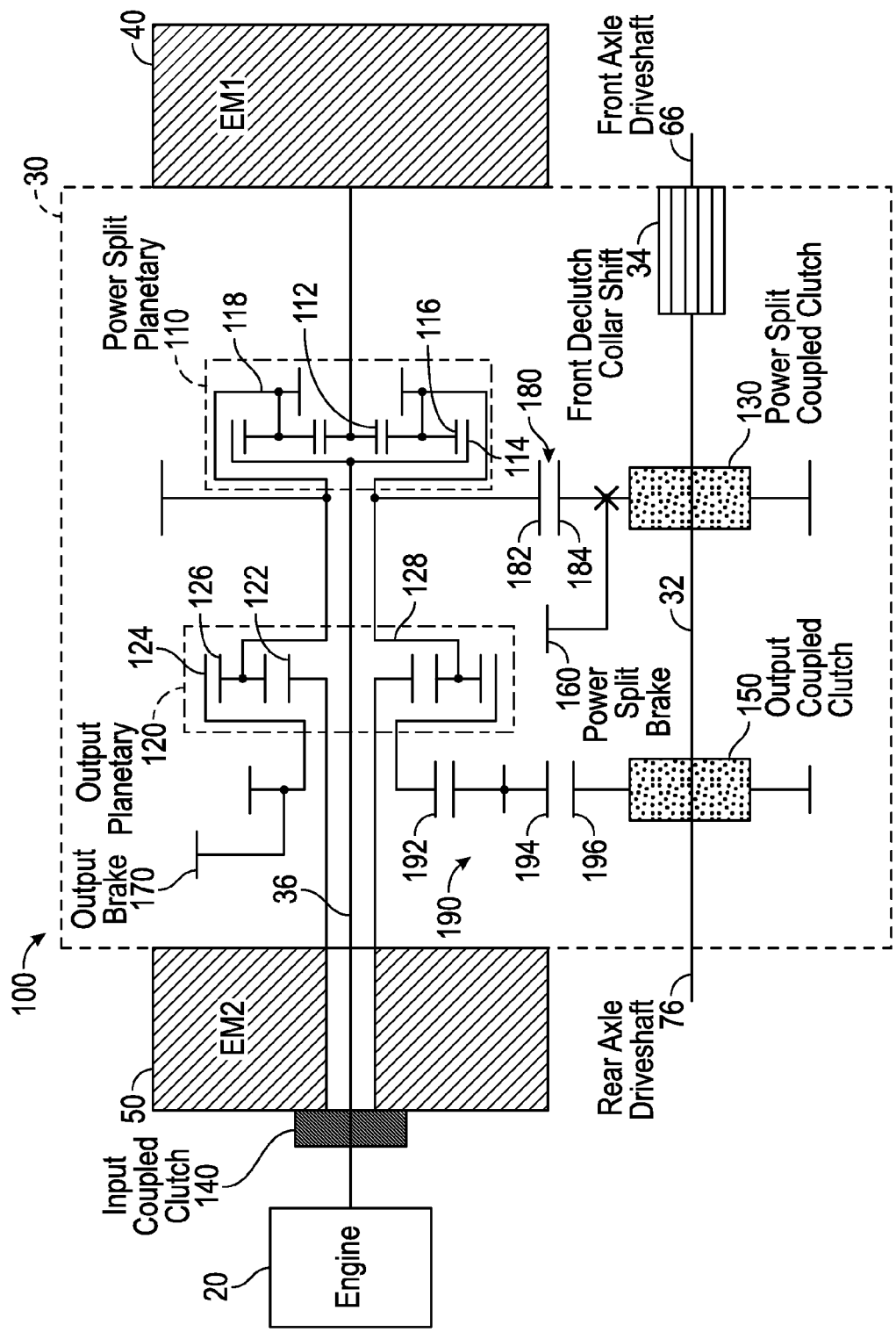
FIG. 5 is a detailed schematic view of a drive train configured in a power generation mode of operation, according to an exemplary embodiment.

As shown in FIG. 5, transmission 30 is selectively reconfigured into a power generation mode such that rotation of connecting shaft 36 rotates first electromagnetic device 40 and second electromagnetic device 50 to generate electrical power. In one embodiment, the electrical power is stored for future use. In another embodiment, the electrical power is used to power internal devices (e.g., control system 200, components of the vehicle, etc.) and/or external devices. As shown in FIG. 5 and Table 1, power split brake 160 and input coupled clutch 140 are engaged when transmission 30 is configured in the power generation mode. As shown in FIG. 5, both power split coupled clutch 130 and output coupled clutch 150 are not engaged such that engine 20 is isolated from output shaft 32. Engine 20 does not provide rotational mechanical energy to tires 62 or tires 72 during the power generation mode.

According to an exemplary embodiment, engine 20 provides a rotational mechanical energy input to connecting shaft 36, which drives both first electromagnetic device 40 and second electromagnetic device 50. As shown in FIG. 5, second electromagnetic device 50 is rotationally coupled to engine 20 via the engagement of input coupled clutch 140 with connecting shaft 36 such that second electromagnetic device 50 generates electrical power. The rotational mechanical energy of connecting shaft 36 is also provided to ring gear 114 of power split planetary 110. Engaging power split brake 160 inhibits the rotational movement of gear 182, gear 184, and carrier 118. Ring gear 114 conveys the rotational mechanical energy from connecting shaft 36 to the plurality of planetary gears 116. The plurality of planetary gears 116 rotate about central axes thereof, while remaining rotationally fixed relative to sun gear 112 such that the rotational mechanical energy is transferred to sun gear 112. Sun gear 112 provides the rotational mechanical energy from engine 20 to first electromagnetic device 40 via the shaft of first electromagnetic device 40 such that first electromagnetic device 40 generates electrical power.

Figure 6:
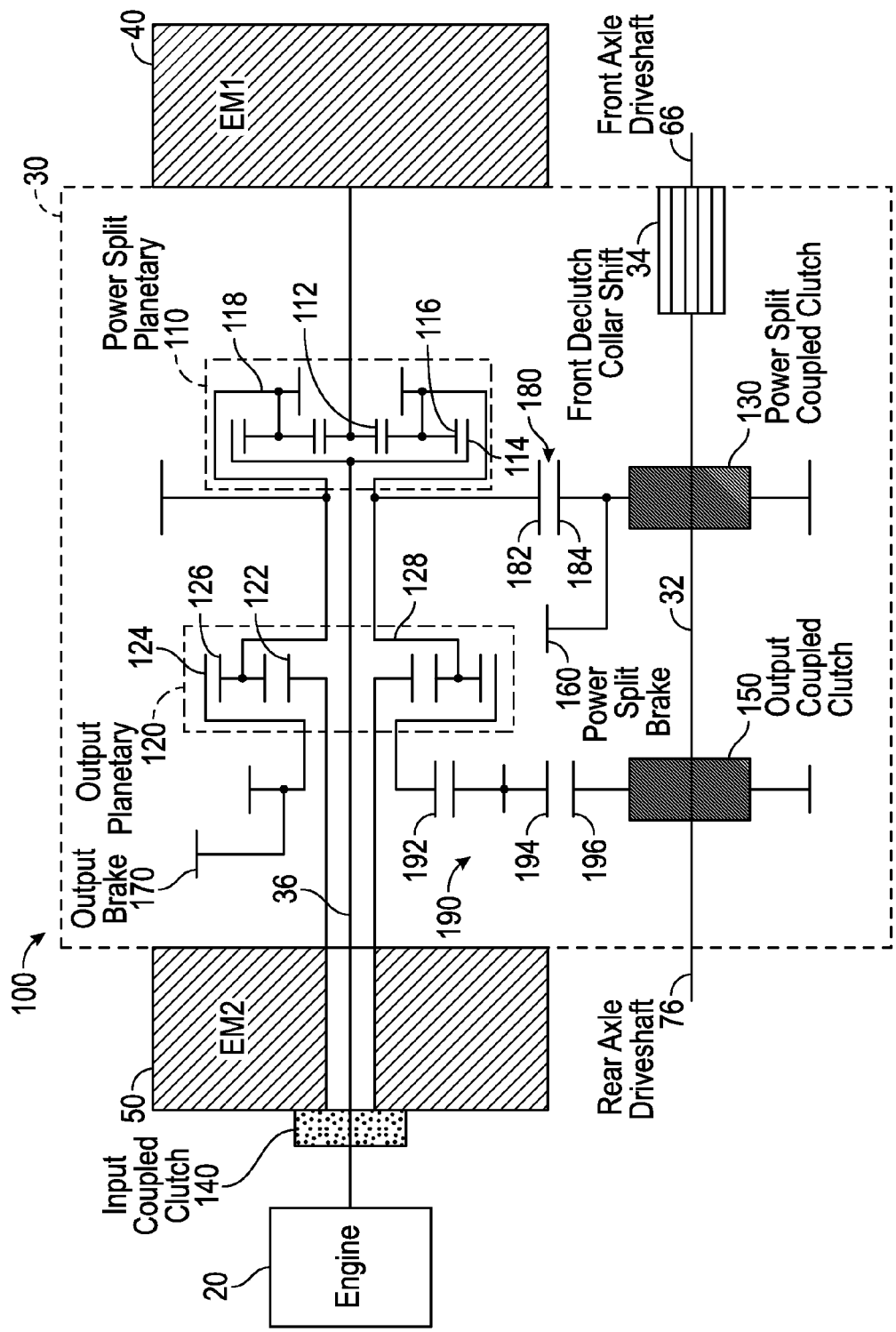
FIG. 6 is a detailed schematic view of a drive train configured in a low range mode of operation, according to an exemplary embodiment.

As shown in FIG. 6, transmission 30 is selectively reconfigured into a low range mode of operation such that transmission 30 allows for a low output speed operation with a high output torque. The low range mode increases a vehicle's gradability (e.g., facilitates the vehicle maintaining speed on a grade, etc.). In one embodiment, engine 20 provides a rotational mechanical energy input to transmission 30 such that first electromagnetic device 40 generates electrical power and second electromagnetic device 50 uses the generated electrical power to provide a rotational mechanical energy input to transmission 30. As such, engine 20 and second electromagnetic device 50 provide a rotational mechanical energy input to drive at least one of tires 62 and tires 72. In an alternative embodiment, first electromagnetic device 40 operates as a motor and second electromagnetic device 50 operates as a generator when transmission 30 is configured in the low range mode.

As shown in FIG. 6 and Table 1, power split coupled clutch 130 and output coupled clutch 150 are engaged when transmission 30 is configured in the low range mode. As shown in FIG. 6, power split coupled clutch 130 and output coupled clutch 150 couple gear set 180 and gear set 190 to output shaft 32, respectively. Accordingly, when engine 20 provides a rotational mechanical energy input to transmission 30, both power split planetary 110 and output planetary 120 drive output shaft 32 via gear set 180 and gear set 190, respectively. According to the exemplary embodiment shown in FIG. 6, an energy flow path for the low range includes: engine 20 providing a rotational mechanical energy input to connecting shaft 36; connecting shaft 36 conveying the rotational mechanical energy to ring gear 114; ring gear 114 causing the plurality of planetary gears 116 to rotate about central axes thereof, as well as about sun gear 112 such that both carrier 118 and sun gear 112 rotate; and the rotation of sun gear 112 driving first electromagnetic device 40 such that it operates as a generator (e.g., generates electrical energy, etc.).

Referring still to FIG. 6, the rotation of carrier 118 drives both carrier 128 and gear set 180. Carrier 128 drives the plurality of planetary gears 126 to rotate about sun gear 122 and about central axes thereof. In one embodiment, second electromagnetic device 50 receives electrical energy generated by first electromagnetic device 40. Accordingly, second electromagnetic device 50 operates as a motor, providing a rotational mechanical energy input to sun gear 122. The sun gear 122 conveys the rotational mechanical energy to the plurality of planetary gears 126 such that each further rotates about the central axis thereof. The plurality of planetary gears 126 drive ring gear 124, and the rotation of ring gear 124 drives gear set 190. According to the exemplary embodiment shown in FIG. 6, gear set 180 and gear set 190 transfer a torque to and from output shaft 32 with power split coupled clutch 130 and output coupled clutch 150 engaged. As such, engine 20 and second electromagnetic device 50 move a vehicle at a low speed with a high output torque.

Figure 7:
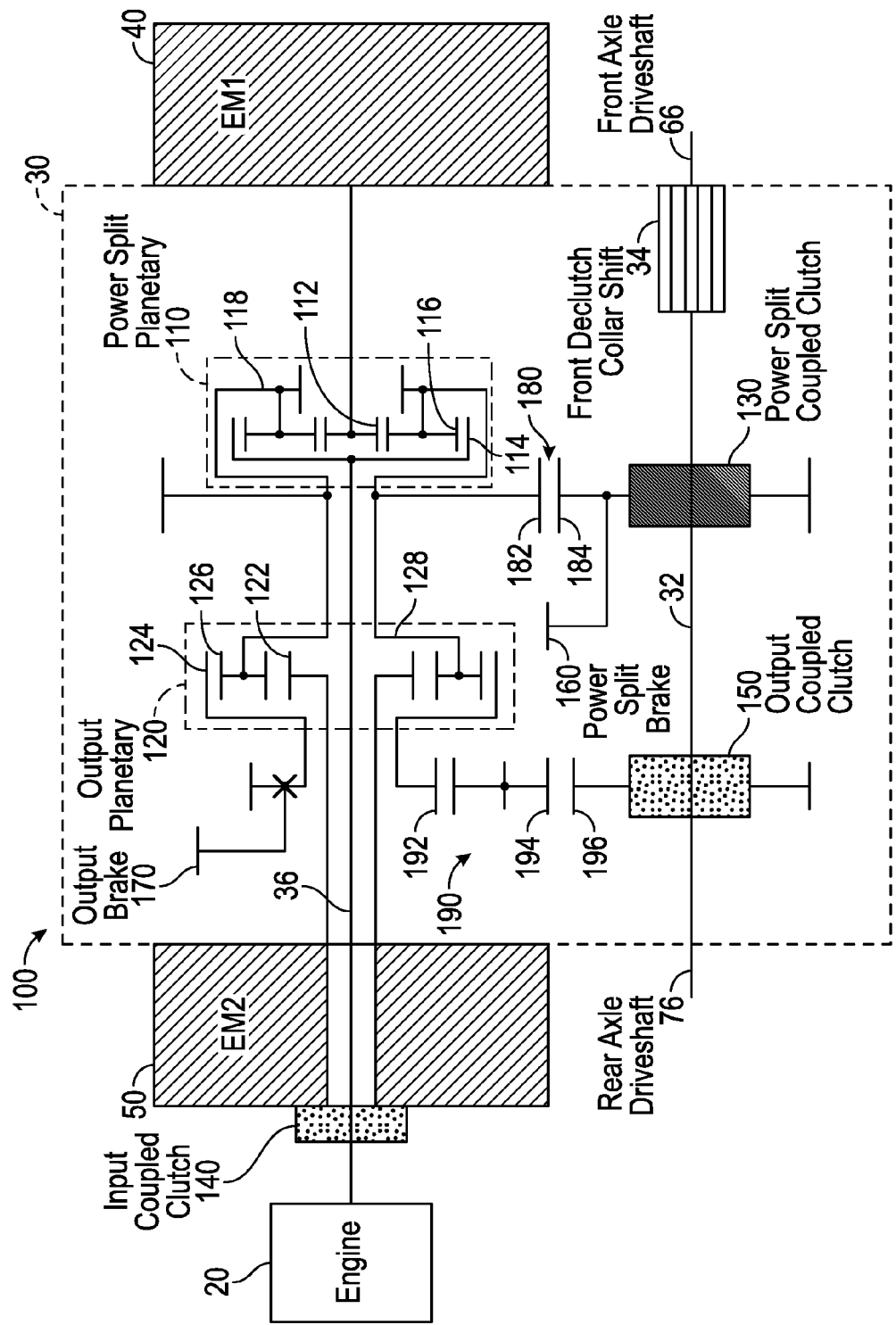
FIG. 7 is a detailed schematic view of a drive train configured in a mid range mode of operation, according to an exemplary embodiment.

As shown in FIG. 7, transmission 30 is selectively reconfigured into a mid range mode of operation such that transmission 30 allows for a mid range output speed operation. The mid range mode may improve low output speed torque and high output speed power. In one embodiment, engine 20 provides a rotational mechanical energy input such that first electromagnetic device 40 generates electrical power, and second electromagnetic device 50 uses the generated electrical power to provide a rotational mechanical energy input to transmission 30. As such, second electromagnetic device 50 provides a rotational mechanical energy input to drive at least one of tires 62 and tires 72. In an alternative embodiment, second electromagnetic device 50 operates as a generator and first electromagnetic device 40 operates as a motor when transmission 30 is configured in the mid range mode. In still another alternative embodiment, both first electromagnetic device 40 and second electromagnetic device 50 operate as a generator in the mid range mode.

As shown in FIG. 7 and Table 1, power split coupled clutch 130 and output brake 170 are engaged when transmission 30 is configured in the mid range mode. As shown in FIG. 7, output brake 170 inhibits the rotation of gear set 190 (e.g., gear 192, gear 194, gear 196, etc.). Output brake 170 thereby rotationally fixes ring gear 124. In one embodiment, engaging output brake 170 substantially eliminates a power dip between output and input modes of transmission 30. According to the exemplary embodiment shown in FIG. 7, an energy flow path for the mid range mode includes: engine 20 providing a rotational mechanical energy input to connecting shaft 36 that is conveyed to ring gear 114; and ring gear 114 driving the plurality of planetary gears 116 to rotate about central axes thereof, as well as about sun gear 112 such that both carrier 118 and sun gear 112 rotate.

Referring still to FIG. 7, the rotation of carrier 118 drives carrier 128, which rotates the plurality planetary gears 126 about central axes thereof, as well as about sun gear 122. With ring gear 124 fixed by output brake 170, second electromagnetic device 50 may operate as a motor. In one embodiment, second electromagnetic device 50 receives electrical energy generated by first electromagnetic device 40. Accordingly, first electromagnetic device 40 operates as a generator, removing a rotational mechanical energy from sun gear 112. The sun gear 122 conveys the rotational mechanical torque to the plurality of planetary gears 126 such that each further rotates about sun gear 122 (e.g., at an increased rotational speed, etc.). The rotation of the plurality of planetary gears 126 (e.g., effected by sun gear 122, etc.) drives carrier 128 and thereby gear set 180. As shown in FIG. 7, power split coupled clutch 130 couples gear set 180 to output shaft 32 such that the rotational mechanical energy of gear set 180, received from second electromagnetic device 50, drives output shaft 32 at a mid range output speed and may thereby drive a vehicle at a mid range output speed.

Figure 8:
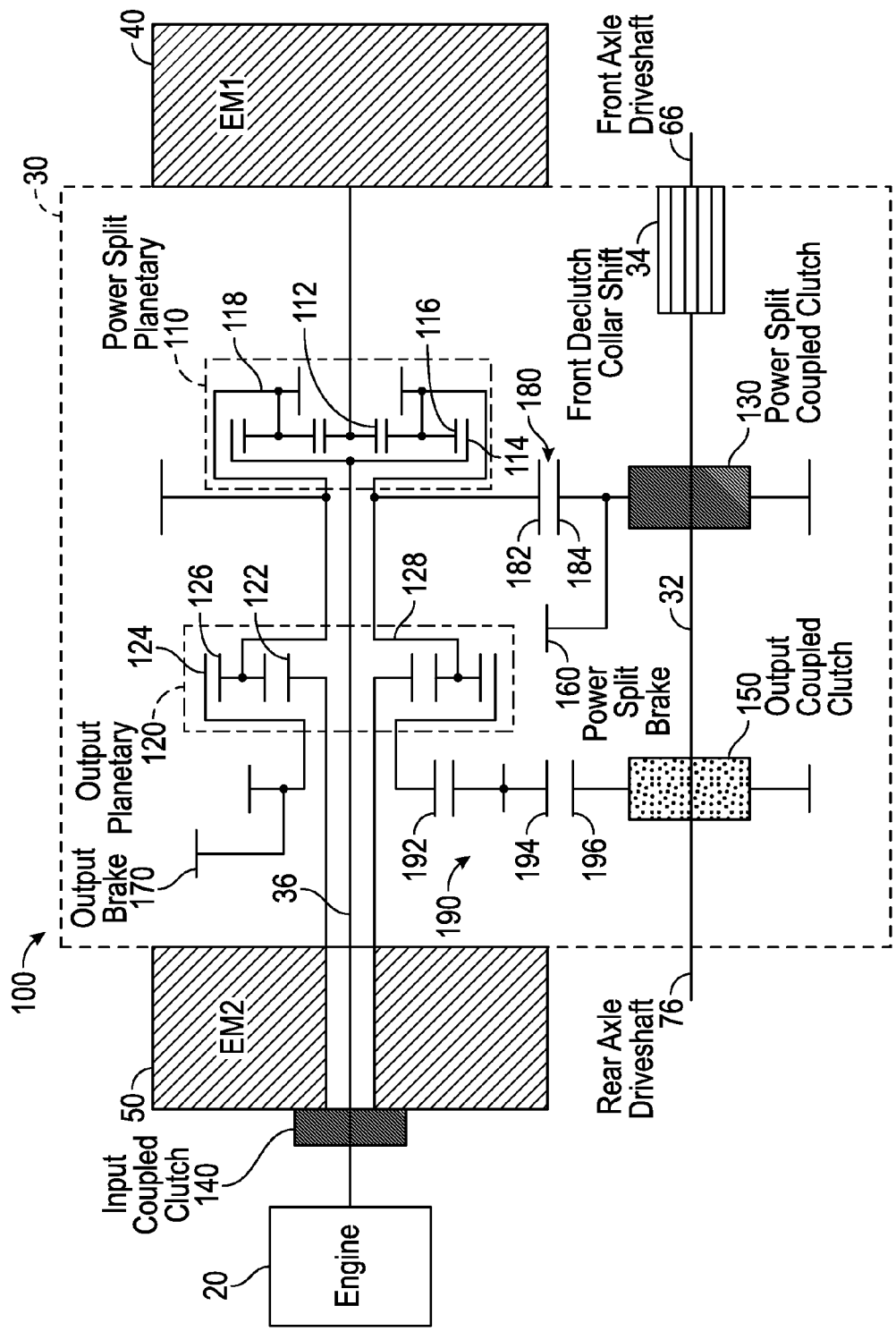
FIG. 8 is a detailed schematic view of a drive train configured in a high range mode of operation, according to an exemplary embodiment.

As shown in FIG. 8, transmission 30 is selectively reconfigured into a high range mode of operation such that transmission 30 allows for a high output speed operation. In one embodiment, engine 20 provides a rotational mechanical energy input such that second electromagnetic device 50 generates electrical power and first electromagnetic device 40 uses the generated electrical power to provide a rotational mechanical energy input to transmission 30. As such, engine 20 and first electromagnetic device 40 provide a rotational mechanical energy input to drive at least one of tires 62 and tires 72. In an alternative embodiment, first electromagnetic device 40 operates as a generator and second electromagnetic device 50 operates as a motor when transmission 30 is configured in the medium range mode.

As shown in FIG. 8 and Table 1, power split coupled clutch 130 and input coupled clutch 140 are engaged when transmission 30 is configured in the high range mode. As shown in FIG. 8, the engagement of input coupled clutch 140 with connecting shaft 36 rotationally couples engine 20 and second electromagnetic device 50. By way of example, engine 20 may provide a rotational mechanical energy input to connecting shaft 36 such that second electromagnetic device 50 generates electrical energy. In one embodiment, first electromagnetic device 40 receives the electrical energy generated by second electromagnetic device 50. Accordingly, first electromagnetic device 40 operates as a motor, providing a rotational mechanical energy input to sun gear 112 that drives the plurality of planetary gears 116.

Referring still to FIG. 8, the power from engine 20 is transferred to ring gear 114 and the plurality of planetary gears 116. The plurality of planetary gears 116 are driven by both engine 20 (e.g., via ring gear 114, etc.) and first electromagnetic device 40 (e.g., via sun gear 112, etc.). Carrier 118 rotates, which drives gear set 180. As shown in FIG. 8, power split coupled clutch 130 couples gear set 180 to output shaft 32 such that the rotational mechanical energy provided by engine 20 and first electromagnetic device 40 drives a vehicle at a high range speed.

Figure 9:
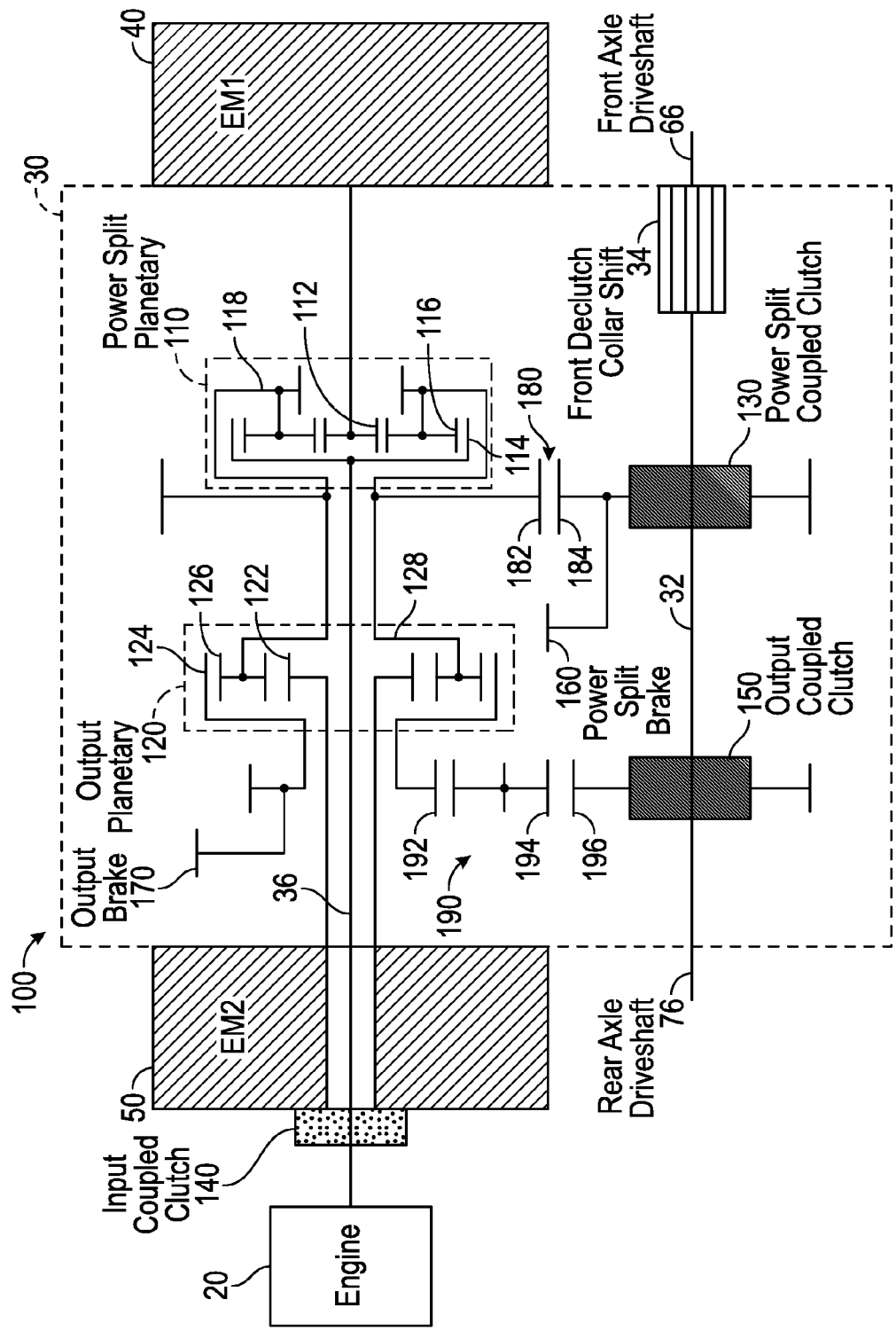
FIG. 9 is a detailed schematic view of a drive train configured in a low speed reverse mode of operation, according to an exemplary embodiment.

As shown in FIG. 9, transmission 30 is selectively reconfigured into a low speed reverse mode of operation. In one embodiment, engine 20 provides a rotational mechanical energy input to transmission 30 such that first electromagnetic device 40 generates electrical power and second electromagnetic device 50 uses the generated electrical power to provide a rotational mechanical energy input to transmission 30. As such, engine 20 and second electromagnetic device 50 provide a rotational mechanical energy input to drive at least one of tires 62 and tires 72 in a reverse direction (e.g., backwards, etc.). In an alternative embodiment, first electromagnetic device 40 operates as a motor and second electromagnetic device 50 operates as a generator when transmission 30 is configured in the low speed reverse mode.

As shown in FIG. 9 and Table 1, power split coupled clutch 130 and output coupled clutch 150 are engaged when transmission 30 is configured in the low speed reverse mode. As shown in FIG. 9, the low speed reverse mode is substantially similar to the low range mode of FIG. 6 in that power split coupled clutch 130 and output coupled clutch 150 couple both gear set 180 and gear set 190 to output shaft 32. In the low speed reverse mode, second electromagnetic device 50 may provide a rotational mechanical energy input to transmission 30 in an opposite direction as compared to the low range mode of FIG. 6.

Figure 10:
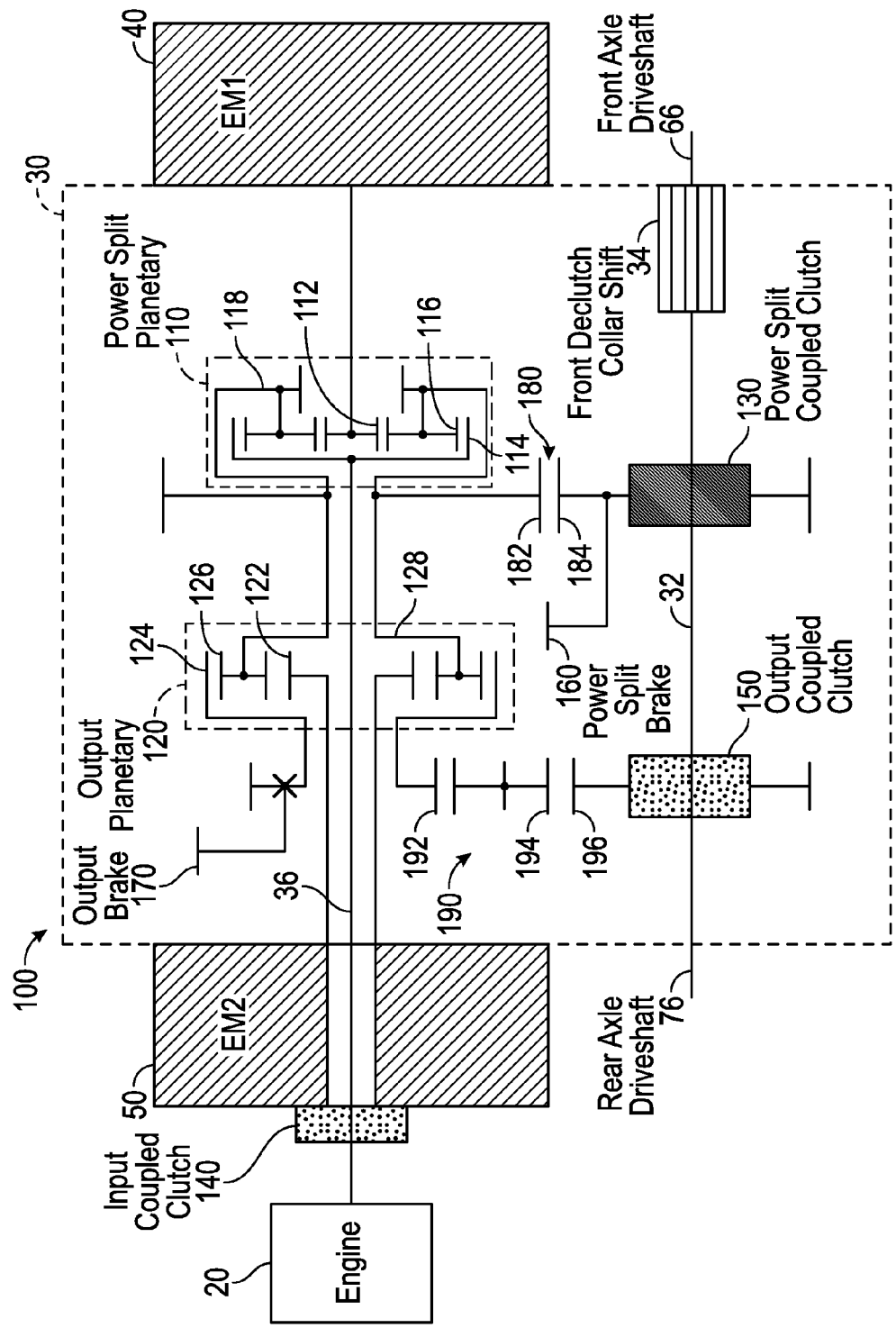
FIG. 10 is a detailed schematic view of a drive train configured in a high speed reverse mode of operation, according to an exemplary embodiment.

As shown in FIG. 10, transmission 30 is selectively reconfigured into a high speed reverse mode of operation such that transmission 30 allows for a high reverse output speed operation. In one embodiment, engine 20 provides a rotational mechanical energy input such that first electromagnetic device 40 generates electrical power, and second electromagnetic device 50 uses the generated electrical power to provide a rotational mechanical energy input to transmission 30. As such, second electromagnetic device 50 provides a rotational mechanical energy input to drive at least one of tires 62 and tires 72. In an alternative embodiment, second electromagnetic device 50 operates as a generator and first electromagnetic device 40 operates as a motor when transmission 30 is configured in the high speed reverse mode. In still another alternative embodiment, both first electromagnetic device 40 and second electromagnetic device 50 operate as a generator in the high speed reverse mode.

As shown in FIG. 10 and Table 1, power split coupled clutch 130 and output brake 170 are engaged when transmission 30 is configured in the high speed reverse mode. As shown in FIG. 10, output brake 170 inhibits the rotation of gear set 190 (e.g., gear 192, gear 194, gear 196, etc.). Output brake 170 thereby rotationally fixes ring gear 124. According to the exemplary embodiment shown in FIG. 10, an energy flow path for the high speed reverse mode includes: engine 20 providing a rotational mechanical energy input to connecting shaft 36 that is conveyed to ring gear 114; and ring gear 114 driving the plurality of planetary gears 116 to rotate about central axes thereof, as well as about sun gear 112 such that both carrier 118 and sun gear 112 rotate.

Referring still to FIG. 10, the rotation of carrier 118 drives carrier 128, which rotates the plurality planetary gears 126 about central axes thereof, as well as about sun gear 122. With ring gear 124 fixed by output brake 170, second electromagnetic device 50 may operate as a motor. In one embodiment, second electromagnetic device 50 receives electrical energy generated by first electromagnetic device 40. Accordingly, first electromagnetic device 40 operates as a generator, removing a rotational mechanical energy from sun gear 112. The sun gear 122 conveys the rotational mechanical torque to the plurality of planetary gears 126 such that each further rotates about sun gear 122 (e.g., at an increased rotational speed, etc.). The rotation of the plurality of planetary gears 126 (e.g., effected by sun gear 122, etc.) drives carrier 128 and thereby gear set 180. As shown in FIG. 10, power split coupled clutch 130 couples gear set 180 to output shaft 32 such that the rotational mechanical energy of gear set 180, received from second electromagnetic device 50, drives output shaft 32 at a high reverse output speed and may thereby drive a vehicle at a high reverse output speed.

According to an alternative embodiment, transmission 30 is selectively reconfigured into a high speed reverse mode of operation (e.g., a series electric mode, etc.) whereby output coupled clutch 150 and the optional power split brake 160 are engaged. In such a high speed reverse mode, engine 20 may be coupled to first electromagnetic device 40 such that rotation of first electromagnetic device 40 by engine 20 generates electric power to operate second electromagnetic device 50 as a motor. According to an exemplary embodiment, power split brake 160 increases the reverse range (e.g., potential speed range while in reverse, etc.) without increasing the gear speeds of transmission 30 to substantial levels. Output coupled clutch 150 may couple output planetary 120 and gear set 190 to output shaft 32 such that second electromagnetic device 50 provides a mechanical output to output shaft 32.

Power split brake 160 may inhibit the rotational movement of gear 182, gear 184, and carrier 118 such that each remains rotationally fixed. Accordingly, carrier 128 remains rotationally fixed. Engine 20 may provide a rotational mechanical energy input to connecting shaft 36. Connecting shaft 36 conveys the rotational mechanical energy to ring gear 114, which drives the plurality of planetary gears 116 to rotate about central axes thereof, in turn rotating sun gear 112. First electromagnetic device 40 receives the rotational mechanical energy from engine 20 to generate electrical power. In one embodiment, the electrical power is used by second electromagnetic device 50 to drive sun gear 122. Sun gear 122 causes the plurality of planetary gears 126 to rotate about central axes thereof to drive ring gear 124. Ring gear 124 drives gear set 190 such that the rotational mechanical energy provided by second electromagnetic device 50 drives output shaft 32 and thereby a vehicle at a high speed in a reverse direction.

According to an alternative embodiment, engine 20 does not provide a rotational mechanical energy input to drive a vehicle. By way of example, first electromagnetic device 40, second electromagnetic device 50, and/or another device may store energy during the above mentioned modes of operation. When sufficient energy is stored (e.g., above a threshold level, etc.), at least one of first electromagnetic device 40 and second electromagnetic device 50 may provide a rotational mechanical energy input to transmission 30 such that the vehicle is driven without an input from engine 20 (e.g., an electric mode, etc.).

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps. contrariwise As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the electromechanical variable transmission as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A drive system for a vehicle, comprising:
   a first gear set including a first sun gear, a first ring gear, a first plurality of planetary gears coupling the first sun gear to the first ring gear, and a first carrier rotationally supporting the first plurality of planetary gears;
   a second gear set including a second sun gear, a second ring gear, a second plurality of planetary gears coupling the second sun gear to the second ring gear, and a second carrier rotationally supporting the second plurality of planetary gears, wherein the first carrier is directly coupled to the second carrier;
   a first electrical machine directly coupled to the first sun gear of the first gear set;
   a second electrical machine directly coupled to the second sun gear of the second gear set;
   a connecting shaft directly coupling an engine to the first ring gear of the first gear set;
   a driveshaft configured to transport power from the first electrical machine, the second electrical machine, and the engine to a tractive element of the vehicle;
   a first clutch selectively rotationally coupling the first carrier and the second carrier to the driveshaft when engaged; and
   a second clutch selectively rotationally coupling the connecting shaft to the second electrical machine when engaged.

2. The drive system of claim 1, further comprising a third clutch selectively rotationally coupling the second gear set to the driveshaft when engaged and a brake positioned to selectively limit a rotational movement of the second ring gear.

3. The drive system of claim 2, wherein the drive system is selectively reconfigurable into a low range mode whereby the first clutch and the third clutch are engaged, wherein the drive system is selectively reconfigurable into a mid range mode whereby the first clutch and the brake are engaged, and wherein the drive system is selectively reconfigurable into a high range mode whereby the first clutch and the second clutch are engaged.

4. The drive system of claim 1, wherein the drive system is selectively reconfigurable into a power generation mode whereby a brake and the second clutch are engaged such that rotation of the connecting shaft rotates the first electrical machine and the second electrical machine to generate electrical power.

5. The drive system of claim 4, further comprising a third clutch selectively rotationally coupling the second gear set to the driveshaft when engaged, wherein the drive system is selectively reconfigurable into a series electric mode whereby the brake and the third clutch are engaged such that rotation of the first electrical machine generates electricity that powers the second electrical machine to provide a mechanical output to the driveshaft.

6. The drive system of claim 5, further comprising a second brake positioned to selectively limit a rotational movement of the second ring gear.

7. A drive system for a vehicle, comprising:
   a first planetary gear set;
   a second planetary gear set coupled to the first planetary gear set;
   an engine coupled to the first planetary gear set with a connecting shaft, wherein the first planetary gear set, the second planetary gear set, and the connecting shaft are radially aligned;
   a first electromagnetic device coupled to the first planetary gear set, wherein the first electromagnetic device includes a first shaft;
   a second electromagnetic device coupled to the second planetary gear set and selectively rotationally engaged with the engine, wherein the second electromagnetic device includes a second shaft, wherein the first shaft and the second shaft are radially aligned with the first planetary gear set, the second planetary gear set, and the connecting shaft, and wherein the connecting shaft extends through the second electromagnetic device and through the second planetary gear set to the first planetary gear set; and
   an output selectively coupled to the first planetary gear set and the second planetary gear set, wherein the output is radially offset from the first planetary gear set, the second planetary gear set, and the connecting shaft;
   wherein the drive system is selectively reconfigurable into a low range mode whereby the output is coupled to the first planetary gear set and the second planetary gear set, wherein the drive system is selectively reconfigurable into a mid range mode whereby the output is coupled to the first planetary gear set and a rotational movement of the second planetary gear set is limited, and wherein the drive system is selectively reconfigurable into a high range mode whereby the output is coupled to the first planetary gear set and the second electromagnetic device is rotationally engaged with the engine.

8. The drive system of claim 7, further comprising a brake positioned to selectively limit a rotational movement of the second planetary gear set.

9. The drive system of claim 7, wherein the first planetary gear set and the second planetary gear set are disposed between the first electromagnetic device and the second electromagnetic device.

10. The drive system of claim 7, further comprising a brake positioned to selectively limit a rotational movement of the first planetary gear set when engaged, wherein the drive system is selectively reconfigurable into a neutral startup mode whereby the brake is engaged such that rotation of the first electromagnetic device rotates the connecting shaft to start the engine.

11. The drive system of claim 10, wherein the drive system is selectively reconfigurable into a power generation mode whereby the brake is engaged and the second electromagnetic device is rotationally engaged with the engine such that rotation of the connecting shaft rotates the first electromagnetic device and the second electromagnetic device to generate electrical power.

12. The drive system of claim 11, wherein the drive system is selectively reconfigurable into a series electric mode whereby the brake is engaged and the output is coupled to the second planetary gear set such that rotation of the first electromagnetic device generates electricity that powers the second electromagnetic device to provide a mechanical power to the output.

13. A vehicle, comprising:
a multi-mode transmission including:
a first gear set having a first planetary gear carrier and a second gear set having a second planetary gear carrier, wherein the first planetary gear carrier and the second planetary gear carrier are rotatably coupled;
a first motor/generator coupled to the first gear set; and
a second motor/generator coupled to the second gear set;
an engine selectively coupled to the second gear set; and
a drive axle selectively coupled to the multi-mode transmission;
wherein during a power generation mode of the multi-mode transmission the engine is coupled to the second motor/generator and decoupled from the drive axle, and
wherein during a series electric mode of the multi-mode transmission the engine is decoupled from the second motor/generator, the second motor/generator is selectively coupled to the drive axle, and the engine is coupled to the first motor/generator.

14. The vehicle of claim 13, further comprising a first clutch positioned to selectively couple the first planetary gear carrier and the second planetary gear carrier to the drive axle.

15. The vehicle of claim 14, further comprising a brake positioned to selectively limit movement of the first planetary gear carrier and the second planetary gear carrier when engaged.

16. The vehicle of claim 15, wherein the engine is coupled to the first gear set with a connecting shaft, and wherein during a neutral startup mode the brake is engaged such that rotation of the first motor/generator rotates the connecting shaft to start the engine.

17. The vehicle of claim 16, further comprising a second brake positioned to selectively limit movement of a ring gear of the second gear set.

18. The vehicle of claim 17, further comprising a second clutch positioned to selectively couple the second motor/generator to the engine and a third clutch positioned to selectively couple the second gear set to the drive axle, wherein during a low range mode of the multi-mode transmission the first clutch and the third clutch are engaged, wherein during a mid range mode of the multi-mode transmission the first clutch and the second brake are engaged, and wherein during a high range mode of operation the first clutch and the second clutch are engaged.

19. A drive system for a vehicle, comprising:
a first gear set including a first sun gear, a first ring gear, a first plurality of planetary gears coupling the first sun gear to the first ring gear, and a first carrier rotationally supporting the first plurality of planetary gears;
a second gear set including a second sun gear, a second ring gear, a second plurality of planetary gears coupling the second sun gear to the second ring gear, and a second carrier rotationally supporting the second plurality of planetary gears, wherein the first carrier is directly coupled to the second carrier;
a first electrical machine directly coupled to the first sun gear of the first gear set;
a second electrical machine directly coupled to the second sun gear of the second gear set;
a driveshaft configured to transport power from the first electrical machine and the second electrical machine to a tractive element of the vehicle;
a first clutch selectively rotationally coupling the first carrier and the second carrier to the driveshaft when engaged; and
a second clutch selectively rotationally coupling the second gear set to the drive shaft when engaged.

\* \* \* \* \*